Oct. 17, 1961 H. L. SEIDEN 3,004,646
CLUTCH-BRAKE MECHANISM
Filed Dec. 29, 1958
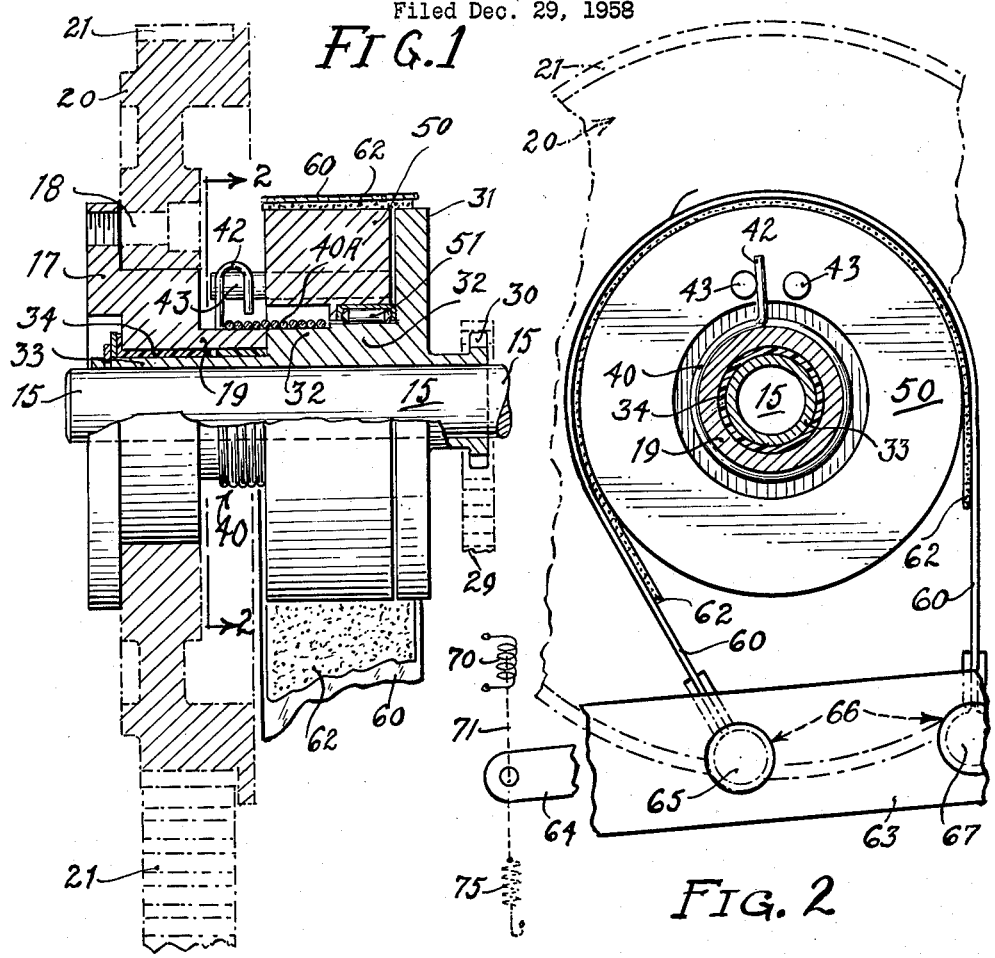
FIG. 1
FIG. 2
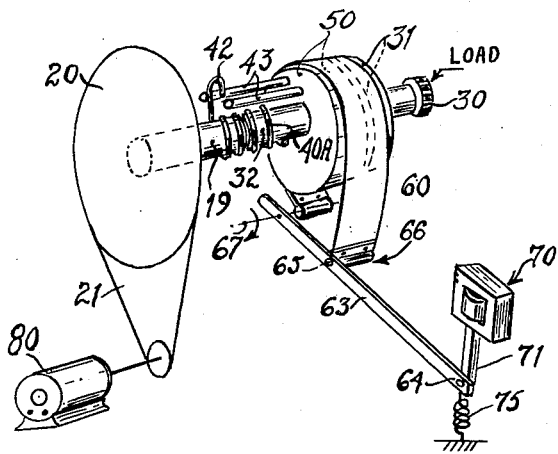
FIG. 3
Herman L. Seiden
Attorney

United States Patent Office 3,004,646
Patented Oct. 17, 1961

3,004,646
CLUTCH-BRAKE MECHANISM
Herman L. Seiden, Chicago, Ill., assignor to Lectromatic Devices, Inc., Chicago, Ill., a corporation of Illinois
Filed Dec. 29, 1958, Ser. No. 783,431
2 Claims. (Cl. 192—17)

This invention relates to improvements in electromechanical clutches of the spring-torque type employing some form of helical spring to seize a driving or driven shaft or member when turned in one direction and running free or slipping when relaxed or turned in the opposite direction.

Clutches of this general type have been used extensively for intermittent and unidirectional applications involving small loads, but they are subject to creepage and are not satisfactory where accurate indexing or registry is required, as in having a shaft return always to the same starting position, not only because of creepage but because of carry-over after release of the clutch owing to a slight lag between the time the clutch is released and the actual release is effected.

The present improvements provide a clutch of rugged construction capable of continuous duty, having electromagnetic actuating means and a built-in braking means which is also a major part of the control means for the clutching action, such that carry-over is eliminated and the clutching action is sufficiently consistent as to seizure and release to permit use in a machine for web and sheet-feeding such as alluded to hereinafter, and as disclosed in a copending application Serial No. 745,165.

The several objects and aspects of novelty and utility inherent in the construction and operation of new clutch mechanism will become apparent as the following description proceeds in view of the annexed drawing in which:

FIG. 1 is a side elevation of the clutch mechanism without the electromagnetic operator and with parts shown in partial section and dotted lines;

FIG. 2 is a partial transverse section through the device looking in the direction of lines 2—2 of FIG. 1 and showing parts in elevation and other parts in dotted lines;

FIG. 3 is an exploded perspective schematic illustrative of the essential parts and principle of operation and control of the new clutch means.

As seen in FIG. 1, the clutch assembly includes a large input or driving gear 20 from which power will be derived through the clutch means to drive a smaller output pinion 30 driving an output gear belt 29, or a sprocket chain or the like, while the input gear in this example is driven through a gear belt 21 from a motor or other source of power.

In a preferred construction, the output pinion 30 is formed as an integral part of a driven output member including a large drum 31 having two stepped hubs 32 and 33, the latter being of lesser diameter than the former.

The drum 31 floats on a shaft 14 and the smaller hub 33 constitutes a seat for a sleeve bearing 34 upon which an input driving member including a gear hub 17 floats in conjunction with the driving gear 20 seated upon a shoulder thereof and attached thereto as by bolts at 18.

The large driving-gear hub 17 has a stepped hub portion 19 which abuts the end of the larger output gear hub 32 and is of the same diameter as the latter, so that the peripheral surfaces of these abutting and aligned hub portions will provide contiguous flush peripheries defining a cylindrical seat for a helical clutch spring 40, portions 40A of which snugly encircle and can grab the output drum hub portions at 32 on application of torque in the proper direction to tighten the coil.

A free end portion of the clutch spring is offset and projected to form a turned-back control loop or hook 42 which extends radially above the axis of the system and lies between two axially-extending pins 43 (FIG. 2, also) set into the face of a rotatable braking and control drum 50 riding free on needle bearings 51 which in turn ride on the hub portion 32 of the output and gear drum member 31.

As depicted in FIG. 2, there is provided a flexible metal brake band 60 having loops 66 formed at both ends, one end being anchored upon a bolt or pin 67 fixed in a wall or like part of whatever machine the clutch is to be associated with (not shown).

Also carried on the bolt 67 as a pivot is a control rocker lever 63, the free end portion 64 of which is shown to foreshortened scale, to illustrate its attachment to an actuating means such as the plunger 71 of an electromagnetic solenoid 70, with spring means 75 normally retracting said plunger for the purpose of actuating the clutch or brake by tightening down the brake band 60 upon the clutch drum 50 and brake drum 31 owing to the connection by another pin 65 of the remaining end loop of said band to the rockable lever 63.

The underside of the band 60 is provided with a suitable brake or clutch facing 62 which grabs drums 50 and 31 to arrest the free rotation thereof and disable or release the clutch in the manner next described.

The operation of the clutch in view of FIG. 3 assumes that the gear belt 21 is driven by some motor means 80 so that the large input gear 20 is continuously rotating on the shell bearing 34 carried on the smaller hub 33 of the output pinion or drum member previously described in view of FIG. 1.

It is further assumed that the output pinion 30 is connected to a driven device or load through gear belt 29, and is at this juncture standing still with the clutch means in disengaged and braked condition, which condition requires that the control solenoid 70 shall be deenergized so that the band 60 is pulled tight by spring 75.

While the large driving gear 20 is rotating, its attached hub structure and particularly the juxtaposed hub portion 19 thereof (which normally tends to carry the spring with it) slips with that portion of the clutch spring 40 which is disposed thereon because the control pins 43 on control or clutch drum 50 are likewise held, and in turn prevent rotation of the spring so that the latter remains relaxed because the direction of rotation of hub 19 is away from the spiral advance.

To set or engage the clutch, solenoid 70 is energized to relax the brake band by raising lever 63 so that the drum 50 is free to follow the spring 40 on hub 19 turning with driving gear 20, which action now occurs owing to the fact that the load on pinion 30 acts in effect the same as a reversely directed torque or twist on the spring, by reason of which the spring grabs the hub portion 32 and causes the whole assembly to rotate as a unit.

Responsive to deenergization of solenoid 70 actuating spring 75 applies the brake to both drums 31 and 50 so that the clutch spring again slips on driving hub 19 while the driven drum and pinion 30—31 is instantly stopped.

As a result of the very prompt disengagement of the clutch and stopping of the load or output side of the unit, the device can be used in applications requiring the accurate stopping of the driven member at a desired position. As one example of such an application, the sheet-feeding and measuring apparatus disclosed in the aforementioned copending patent application involves the stoppage of a vertically reciprocating sheet cutoff knife of substantial weight and proportions adapted to cut sheeting as wide as 36 inches, at the top of its stroke; and clutch means of the type hereinabove described is utilized to drive such a knife and stop it always at proper top position.

I claim:

1. In a clutch, driving and driven members and means mounting the same for coaxial rotation with contiguous hub portions of matching diameter, a helical clutch spring closely embracing said hub portions and adapted to grab the same in coupling action responsive to rotation of the driving member in a given direction depending on the direction of spiral advance of the spring helix, and a control member freely rotatable concentrically with said driving and driven members and having a braking periphery contiguous to a complementary braking periphery on the driven one of said members, means coupling said control member with an endwise portion of said spring helix which is located on the driving member, said control member when free to rotate acting as a torque load on the spring in a direction to cause the latter to grab and rotate with the driving member and thereupon to grab with the driven member and couple the latter with the driving member, said control member when held against rotation applying a torque preventing the spring from grabbing with the driving member as aforesaid; and brake means operable to engage said braking peripheries simultaneously.

2. In a brake clutch of the helical spring type, mechanism comprising a driving member, a driven member, and means mounting the same for rotation in coaxial alignment, the driving and driven members each having spring carrying hubs juxtaposed in flush coaxial contiguity, a control member and means mounting the same to rotate in a path circumambient of the spring hub portion of the driven member, said control member also having a braking periphery flush and contiguous to a braking drum periphery on the driven member, braking means and means mounting the same for operative movement to engage and disengage the braking peripheries of both the control member and the driven member simultaneously, means for operating the braking means as aforesaid, a helical clutch spring having opposite endwise portions each closely encircling one of the contiguous hub portions of the driving and driven members and adapted to clutch said hub portions when control torque is applied to the helix in a certain angular direction about the common axis, said spring also having a portion of its helix projected radially of said axis, and said control member having means positioned radially of said axis to engage said projected helix portion whereby control torque as aforesaid is applied to the helix on rotation of the control member in said certain direction when the control member is brake-free to rotate in said certain direction.

References Cited in the file of this patent

UNITED STATES PATENTS

| | | |
|---|---|---|
| 1,063,064 | Ramsay | May 27, 1913 |
| 2,575,012 | Harvey | Nov. 13, 1951 |
| 2,685,949 | Dunlap | Aug. 10, 1954 |